Nov. 16, 1965  R. G. RONK  3,218,043

FOOD MIXER WITH VERTICAL ACTION BEATERS

Filed Feb. 7, 1964

WITNESSES
Theodore F. Wrobel
James F. Young

INVENTOR
Richard G. Ronk
BY
Robert T. French
ATTORNEY

United States Patent Office 3,218,043
Patented Nov. 16, 1965

3,218,043
FOOD MIXER WITH VERTICAL ACTION BEATERS
Richard G. Ronk, Bellville, Ohio, assignor to Westinghouse Electric Corporation, Pittsburgh, Pa., a corporation of Pennsylvania
Filed Feb. 7, 1964, Ser. No. 343,268
6 Claims. (Cl. 259—129)

This invention relates, generally, to mixers and more particularly to mixers having motor driven beaters of the type utilized for mixing foods and liquids.

It is recognized in the paint mixing art that a better mixing action is obtained by moving a beater vertically while it is being rotated. Manually operated mixers have been provided with devices for reciprocating and rotating a single beater in a mixing vessel. The prior devices known to applicant are not suitable for moving two motor driven beaters axially or vertically while they are being rotated in order to improve the action of a food mixer.

An object of this invention is to obtain a mixing motion of the beaters which is more efficient and will give a better mixing performance in a shorter period of time than prior mixers.

Another object of the invention is to mechanically move two beaters axially or vertically while they are being rotated by one motor.

A further object of the invention is to provide for moving two beaters up and down either alternately or simultaneously as they are rotated.

Other objects of the invention will be explained fully hereinafter or will be apparent to those skilled in the art.

In accordance with one embodiment of the invention, each one of two beater shafts of a mixer is rotated by a gear having a cam area recessed into the bottom inner surface of the gear wheel. The two gears are driven by a worm or other type of gear attached to the shaft or connected to an electric motor mounted in the mixer housing which contains cam surfaces mating with the cam areas in the gears. Thus, each gear and the beater shaft it drives, travel up and down or axially as they rotate through 360°. The axial movement of the beater shafts can be made alternate or simultaneous by a different orientation of the gears on the cam surfaces.

Figure 1:
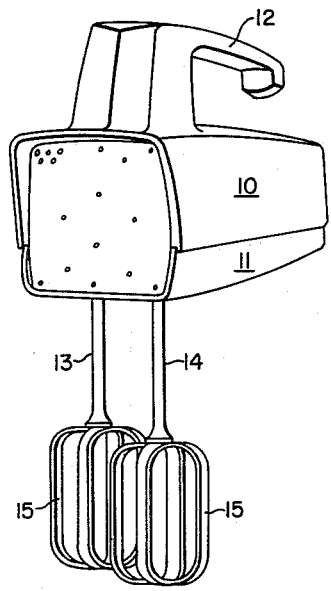
Figure 2:
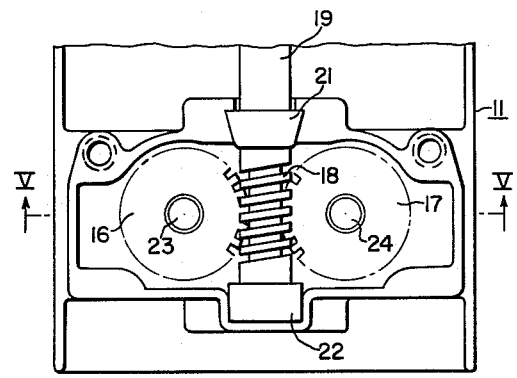
Figure 3:
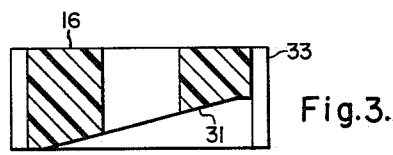
Figure 4:
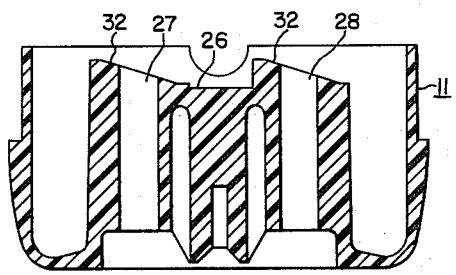

For a better understanding of the nature and objects of the invention, reference may be had to the following detailed description, taken in conjunction with the accompanying drawing, in which:

FIGURE 1 is a view, in perspective, of a mixer embodying features of the invention;
FIGURE 2 is a view, in plan, of a portion of the mixer housing and the gears for driving the beaters;
FIGURE 3 is a sectional view of one of the gears for driving the beaters of the mixer;
FIGURE 4 is a view, in vertical section, taken through the housing portion shown in FIGURE 2, and
FIGURE 5 is a view, partly in elevation and partly in section, taken along the line V—V in FIGURE 2, showing the vertical travel of the gears and the beater spindles for the beater shafts.

Referring to the drawing, and particularly to FIGURE 1, the mixer shown therein is of the portable type adapted to be held in the hand of the operator while being utilized to agitate a substance contained in a mixing vessel (not shown). However, the present invention may be utilized with a mixer which is supported on a stand or other supporting means during the mixing operation. As shown, the mixer comprises a housing having an upper portion 10 and a lower portion 11. The upper portion 10 has a handle 12 which may be formed integrally with the housing portion 10. An electric motor (not shown) is disposed inside the housing. The motor drives two beater shafts 13 and 14 which extend downwardly from the lower portion 11 of the housing. Each beater shaft has a plurality of beater blades 15 secured thereto for performing the mixing operation.

Figure 5:
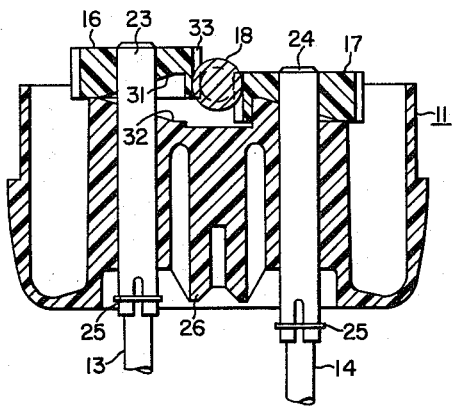

As shown most clearly in FIGURES 2 and 5, the beaters are rotated by gears 16 and 17 which are driven by a worm 18 attached to the motor shaft 19. If desired, the worm 18 may be made an integral part of the motor shaft 19. The shaft 19 may be supported by bearings disposed in bearing housings 21 and 22 which are mounted in the housing portion 11.

As shown in FIGURE 5, the gear 16 is attached to the upper end of a beater spindle 23 and the gear 17 is attached to the upper end of another beater spindle 24. The beater shaft 13 may be retained in the lower end of the beater spindle 23 by means of a spring ring 25, or by other suitable means. Likewise, the beater shaft 14 may be retained in the spindle 24 by a similar spring ring 25. Thus, the beaters may be removed from the mixer for cleaning purposes.

As shown most clearly in FIGURE 4, the housing portion 11 has a transverse wall 26 formed integrally with the housing member 11. The wall 26 has vertical openings 27 and 28 therein for receiving the beater spindles 23 and 24, respectively. The housing portion 11 may be composed of a material suitable for functioning as a bearing member for the beater spindles.

As explained hereinbefore, a more effective mixing operation can be obtained by moving the beaters axially or vertically while they are being rotated. In order to obtain the vertical movement of the beaters, each gear 16 and 17 has a recessed cam area 31 on the bottom side of the gear wheel or member. Similar or mating cam surfaces 32 are provided on the housing portion 11 around the openings 27 and 28 in the transverse wall 26 as shown in FIGURE 4. As shown in FIGURE 3, the cam area 31 is recessed in the bottom inner surface of the gear wheel 16, thereby leaving the entire width of the gear teeth 33 available for engaging the worm 18.

As shown in FIGURE 5, the gears 16 and 17 and the beater shafts driven by the gears are moved axially or vertically while they are being rotated by the worm 18. The cam areas 31 and 32 cooperate to move the gears 16 and 17 up and down while they are being rotated. In FIGURE 5, the gear 16 is shown in its uppermost position and the gear 17 is shown in its lowermost position. When the gear 16 is rotated through 180° it will be in its lowermost position. Likewise, when the gear 17 is rotated through 180° it will be in its uppermost position.

It will be noted that the teeth 33 on the gears remain in engagement with the worm 18 during the up and down movement of the gears. In this manner the shafts 13 and 14 and the beater blades are alternately moved vertically when they are being rotated. Simultaneous vertical motion of the two beater shafts may be obtained by orienting the gears 16 and 17 relative to the worm 18 and the cam surfaces on the housing to cause both gears to be raised simultaneously.

The combined rotating and vertical action of the beaters obtained by utilizing the present invention is particularly advantageous in the mixing of baking ingredients as air is allowed to enter the mix during the pumping or folding action of the beaters. Thus, the most delicate cakes can be mixed with an electric mixer having rotating and vertical action beaters.

When different ingredients are added while mixing, the vertical action of the beaters will reduce the strata effect of the ingredients that usually occurs during conventional or non-vertical beater action. In this manner, a more homogeneous mix can be obtained in a shorter time than can be obtained with beaters having only a rotational action.

The present invention may be utilized with mixers having a worm or other type of gear drive for rotating two beaters. The invention may be readily incorporated in mixers having worm or other types of gear drives by making relatively inexpensive changes in the mixer housing and gear structure.

Since numerous changes may be made in the above-described structure and different embodiments of the invention may be made without departing from the spirit and scope thereof, it is intended that all subject matter contained in the foregoing description or shown in the accompanying drawing shall be interpreted as illustrative and not in a limiting sense.

I claim as my invention:

1. In a mixer, in combination, a housing, a pair of beater shafts extending from the housing, gear means in the housing for rotating each shaft, means for driving the gear means to rotate the shafts simultaneously, and cam means supported by the housing engaging said gear means to move the shafts axially while they are being rotated.

2. In a mixer, in combination, a housing, a pair of beater shafts extending from the housing, a gear in the housing for rotating each shaft, means for driving the gears to rotate the shafts simultaneously, a cam area on each gear, and cam means carried by the housing cooperating with the cam areas on the gears to move the shafts axially while they are being rotated.

3. In a mixer, in combination, a housing, a pair of beater shafts extending from the housing, a worm gear in the housing for rotating each shaft, a worm for driving the worm gears to rotate the shafts simultaneously, a cam area on one side of each worm gear, and cam surfaces on the housing cooperating with the cam areas on the gears to move the shafts axially while they are being rotated.

4. In a mixer, in combination, a housing, a pair of beater shafts extending from the housing, a worm gear in the housing for rotating each shaft, a worm for driving the worm gears to rotate the shafts simultaneously, a recessed cam area on the bottom side of each worm gear, and cam surfaces on the housing cooperating with the cam areas on the gears to move the shafts vertically while they are being rotated.

5. In a mixer, in combination, a housing, a pair of beater shafts extending from the housing, a worm gear in the housing attached to each shaft, a worm for driving the worm gears to rotate the shafts simultaneously, a cam area on each gear, a cam surface on the housing cooperating with the cam area on each gear to move the gear and its attached shaft axially while they are being rotated, and the axial movements of the shafts being alternate or simultaneous depending on the orientation of the gears on the cam surfaces.

6. In a mixer, in combination, a housing, a pair of beater shafts extending from the housing, a worm gear in the housing attached to each shaft, a worm for driving the worm gears to rotate the shafts simultaneously, a recessed cam area on the bottom side of each worm gear, a cam surface on the housing engaging the cam area on each gear to move the gear and its attached shaft vertically while they are being rotated, and the vertical movements of the shafts being alternate or simultaneous depending on the relative positions of the gears on the cam surfaces.

References Cited by the Examiner

UNITED STATES PATENTS

| 127,561 | 6/1872 | Burns | 74—22 |
| 215,090 | 5/1879 | Bridewell | 74—22 |
| 1,007,888 | 11/1911 | Parker | 15—382 X |
| 2,699,925 | 1/1955 | Madl | 259—131 |
| 2,701,131 | 2/1955 | Love | 259—126 |

WALTER A. SCHEEL, *Primary Examiner.*

WILLIAM I. PRICE, *Examiner.*